United States Patent [19]
Richins

[11] 3,756,433
[45] Sept. 4, 1973

[54] MATERIAL HANDLING SYSTEM

[75] Inventor: Kenneth A. Richins, Salt Lake City, Utah

[73] Assignee: Eaton Corporation, Bountiful, Utah

[22] Filed: Apr. 6, 1971

[21] Appl. No.: 131,627

[52] U.S. Cl............. 214/16.4 A, 104/131, 214/1 BB
[51] Int. Cl................................................ B65g 1/06
[58] Field of Search.................. 214/16.4 A, 16.4 B, 214/16.1 EB, 38 BA

[56] References Cited
UNITED STATES PATENTS

| | | | |
|---|---|---|---|
| 2,941,738 | 6/1960 | Burke et al. | 214/16.4 A |
| 1,830,740 | 11/1931 | Leech et al. | 214/38 BA |
| 2,633,809 | 4/1953 | Robinson, Jr. et al. | 214/16.1 EB |
| 2,377,848 | 6/1945 | Bailey | 214/60 X |
| 2,493,493 | 1/1950 | Mariano | 214/16.1 DB |

*Primary Examiner*—Robert J. Spar
*Attorney*—Yount and Tarolli

[57] ABSTRACT

An improved material handling system includes a vehicle, such as a stacker crane, which is movable along an aisle between conveyor tracks and a plurality of storage tracks. When a transfer rail on the stacker crane has been vertically and horizontally aligned with a selected storage track, the transfer rail is extended to engage and form a continuation of the selected storage track. A shuttle assembly on the stacker crane is then extended to engage a material carrier on the storage track. Upon subsequent retraction of the shuttle assembly, the material carrier is moved along the storage track onto the transfer rail on the crane. The transfer rail is then retracted and the crane transports the material carrier along the aisle to a conveyor track which is engaged by again extending the transfer rail. The shuttle assembly is then extended to move the material carrier from the transfer rail on the crane onto the conveyor track. of course, a material carrier could be moved from the conveyor track to a selected storage track by reversing the foregoing process.

16 Claims, 14 Drawing Figures

INVENTOR
KENNETH A. RICHINS
BY Young and Tarolli
ATTORNEYS

FIG. 4

INVENTOR
KENNETH A. RICHINS
BY Yount and Tarolli
ATTORNEYS

MATERIAL HANDLING SYSTEM

The present invention provides a new and improved material handling system in which carriers are transferred between conveyor and storage tracks.

In certain manufacturing or assembly operations, machines are assembled from a large number of relatively small parts. To expedite the assembly of a substantial number of machines, the parts are collected into groups, each of which includes parts required in the assembly of a particular machine. These groups of parts are stored in containers until they are required during the assembly of a machine. The containers of parts are then transported to a work area.

A new and improved material handling system constructed in accordance with the present invention is particularly useful in connection with manufacturing or assembling operations in which parts or other materials are stored in containers or carriers and are subsequently used at a work location. The material handling system enables the carriers to be selectively retrieved from storage locations and transferred to a vehicle, such as a stacker crane, by extension and retraction of the shuttle assembly. During transfer of the carrier from a storage location to the vehicle, movement of the carrier is guided by storage and transfer tracks. The vehicle then transports a selected material carrier to a conveyor track which extends to a work area where the parts or other materials on the selected carrier are to be used. The same container or carrier is utilized to hold the materials when they are being stored, transported by the vehicle, and moved along the conveyor track to the work area.

Accordingly, it is an object of this invention to provide a new and improved material handling system in which a suspended container or carrier is used to hold materials when they are being stored, transported by a vehicle to a conveyor track, and moved along the conveyor track to a work area.

Another object of this invention is to provide a new and improved material handling system wherein a vehicle is movable along an aisle between a selected storage location at which a container or carrier of materials is movable between a length of storage track and a transfer rail or track on the vehicle by extending and retracting a shuttle assembly and a transfer location at which a container or carrier of materials is movable between a conveyor track and the transfer rail or track on the vehicle by extending and retracting the shuttle assembly and wherein guides are provided for guiding movement of the container or carrier between the transfer rail and a storage track or conveyor track.

Another object of this invention is to provide a new and improved material handling apparatus which includes a hanger for suspending a material carrier from storage and transfer tracks, and a shuttle assembly which is operable between a retracted condition and an extended condition to move the hanger between the storage and transfer tracks, and wherein the shuttle assembly includes a linkage for effecting movement of gripper elements between a closed position engaging the hanger and an open position spaced from the hanger, an actuator means being provided for operating this linkage to effect movement of the gripper elements from their closed positions to their open positions to release the hanger upon operation of the shuttle assembly to the extended condition and for operating the linkage to effect movement of the gripper elements from their open positions to their closed positions to engage the hanger upon operation of the shuttle assembly to the extended condition, this actuator means being ineffective to operate the linkage to move the gripper elements between their open and closed positions upon operation of the shuttle assembly from the extended condition to the retracted condition so that as the shuttle assembly is retracted the gripper elements remain in the positions to which they were moved during immediately preceding extension of the shuttle assembly.

Another object of this invention is to provide a new and improved material handling apparatus for use with a vehicle for transporting materials between a conveyor track and a storage track, this material handling apparatus includes a transfer track assembly which is operatively connected to the vehicle and supports a material carrier as it is transported between the conveyor and storage tracks, and wherein the transfer track assembly includes a rail which is movable between a transfer position in which the rail projects outwardly of the vehicle in aligned engagement with either a storage or conveyor track and a retracted condition in which the rail is withdrawn to enable the vehicle to readily move down an aisle extending between the storage and conveyor tracks.

Another object of this invention is to provide a new and improved material handling apparatus in accordance with the next preceding object and wherein a shuttle assembly is provided for moving the carrier between the transfer rail and the conveyor and storage tracks.

These and other objects and features of the present invention will become more apparent upon a consideration of the following description taken in connection with the accompanying drawings wherein:

A material handling system 20 (FIG. 1) constructed in accordance with the present invention includes a vehicle 22 for transporting material carriers or containers 24 between a transfer location 30 and storage locations 32 arranged in horizontally extending rows 34, 36 and 38 on one side of an aisle 40 and in rows 44, 46 and 48 on the opposite side of the aisle. The carriers 24 are filled at a loading area (not shown) with parts or other materials to be stored. The carriers 24 are then transported along a conveyor track 52 from the loading area to the transfer location 30. The vehicle 22 receives each of the carriers 24 in turn at the transfer location 30 and transports them along the aisle 40 to selected storage locations 32. When materials on one of the stored carriers 24 is required at a work location (not shown), the selected carrier is retrieved from its storage location 32 and transported by the vehicle 22 to the transfer location 30. The selected carrier 24 is then transferred to a conveyor track 56 extending to the work location where the materials on the selected carrier are to be utilized.

Figure 2:
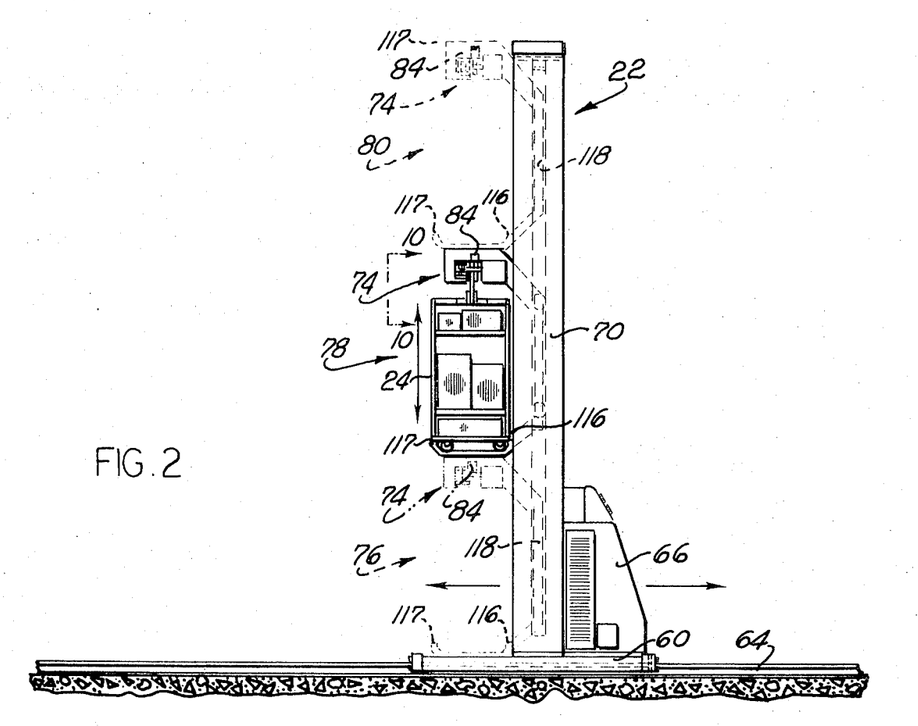
FIG. 2 is an elevational view, taken generally along the line 2—2 of FIG. 1, further illustrating the construction of the vehicle.

In the specific preferred embodiment of the invention illustrated in the drawings, the vehicle 22 is a stacker crane having a base 60 which is driven along tracks 62 and 64 in the aisle 40 by a drive assembly located within a housing 66 (see FIG. 2). A mast 70 extends vertically upwardly from the base 60 and encloses a drive arrangement for raising and lowering a lift or platform assembly 74. When the lift assembly 74 is at its lowermost position, illustrated in dashed lines at 76 in FIG. 2, a carrier 24 can be transferred between the stacker crane 22 and a selected storage location 32 located in either one of the two lower rows 34 or 44. Similarly, when the lift assembly 74 is at its intermediate or center position, illustrated in solid lines at 78 in FIG. 2, a carrier 24 can be moved between the crane 22 and a selected storage location 32 located in either one of the two center rows 36 or 46. Finally, when the lift assembly 74 is at its uppermost position, illustrated in dashed lines at 80 in FIG. 2, a carrier can be moved between the crane 22 and a selected storage location 32 in either one of the two upper rows 38 or 48. Of course, if the storage locations 32 were all located on a common level with the conveyor tracks 52 and 56, the vehicle 22 would not have to be capable of raising and lowering the carriers 24.

Figure 1:
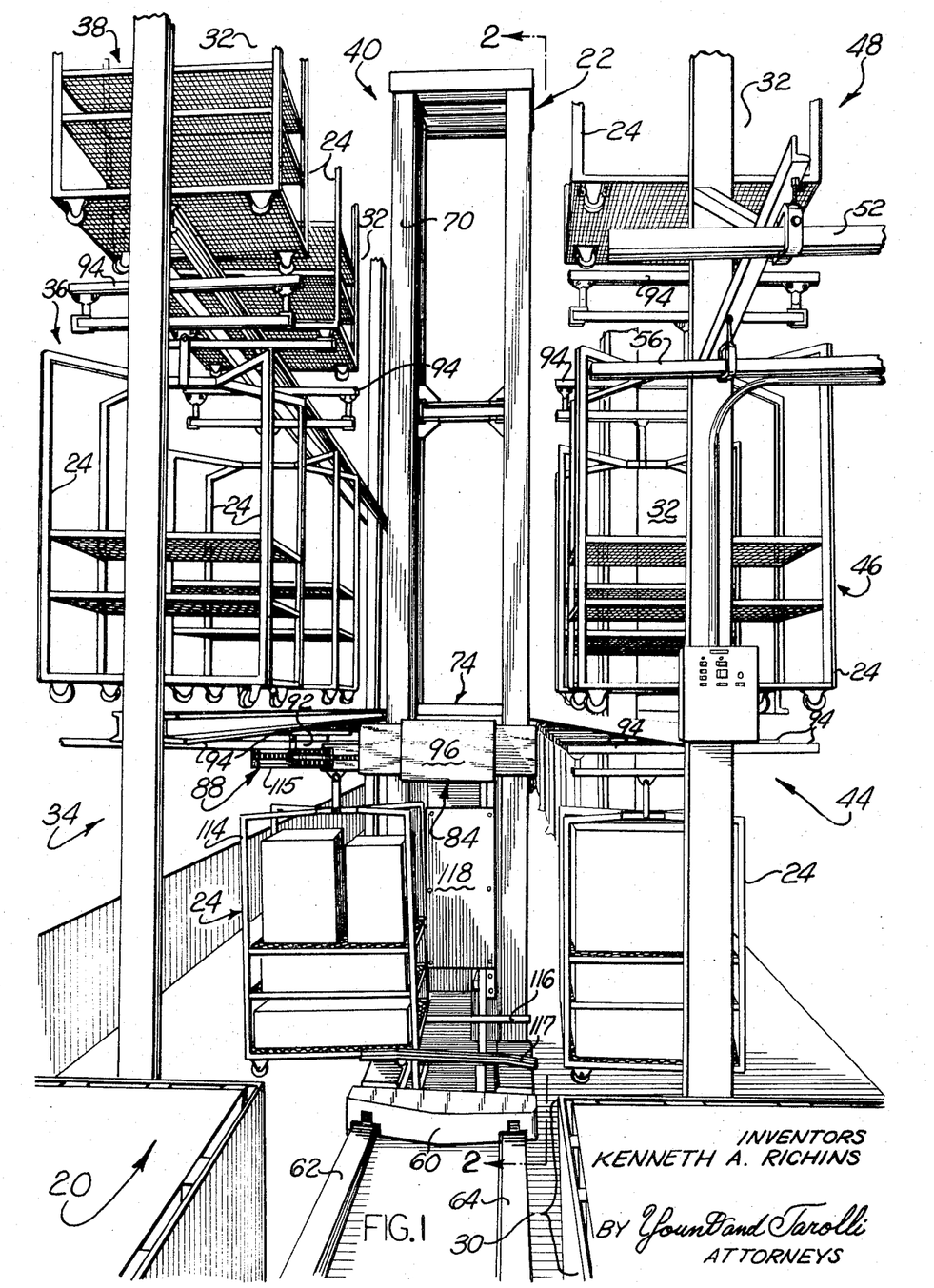
FIG. 1 is a pictorial illustration of a material handling system constructed in accordance with the present invention and including a vehicle for moving a material carrier between storage and conveyor tracks.
Figure 3:
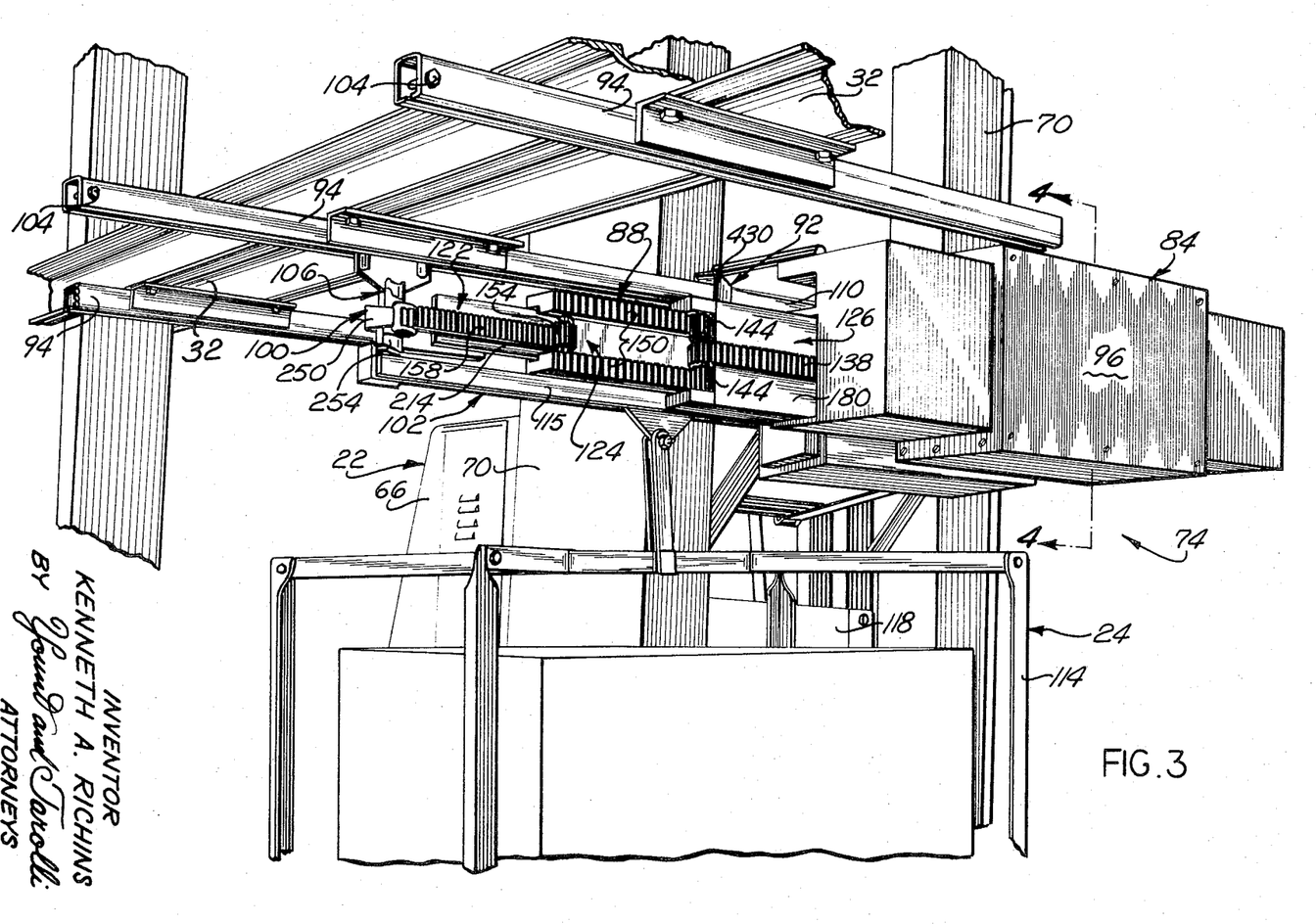
FIG. 3 is a pictorial illustration of the transfer of a material carrier between the vehicle and a storage track by operation of a shuttle assembly.

A transfer assembly 84 (FIG. 1) is provided on the lift assembly 74 to move each of the carriers 24 in turn between the conveyor tracks 52 or 56 and the vehicle 22. In addition, the transfer assembly 84 is operable, when the vehicle 22 is adjacent to a selected storage location 32, to move a carrier 24 between the selected storage location and the vehicle (see FIG. 3). To provide for this movement of each of the carriers 24 in turn, the transfer assembly 84 includes a shuttle assembly 88 and a transfer track or rail assembly 92. The shuttle assembly 88 is extendable and retractable to move a carrier 24 between the transfer track assembly 92 on the vehicle 22 and a conveyor track 52 or 56 at the transfer location 30 (FIG. 1). The shuttle assembly 88 is also extendable and retractable to move a carrier 24 between the transfer track assembly 92 and a storage track 94 at a selected storage location 32 (FIG. 3). This movement of the carrier 24 is guided by the transfer track assembly 92 and by either a storage track 94 or a conveyor track 52 or 56 depending upon the location at which the vehicle 22 is located.

When a carrier 24 is to be transported from the conveyor track 56 to a selected storage location 32, the vehicle 22 is moved along the aisle 40 toward the transfer station 30 (FIG. 1). During this movement of the vehicle 22 along the aisle 40, the shuttle assembly 88 is retracted within a housing 96 (FIGS. 1 and 6) of the transfer assembly 84 so that the shuttle assembly does not bump against carriers located at other storage locations 32. After the vehicle 22 reaches the transfer station 30, the transfer track assembly 92 is extended to form a continuation of the conveyor track 52. The shuttle assembly 88 is extended and a gripper assembly 100 (FIGS. 3, 5 and 7) engages the carrier 24 while it is supported on the conveyor track 52. The shuttle assembly 88 is then retracted to move the carrier 24 along the conveyor track 52 onto the transfer track assembly 92 on the vehicle 22. The transfer track assembly 92 is then retracted away from the conveyor track 52.

Once the shuttle assembly 88 and transfer track assembly 92 have been retracted, the vehicle 22 transports the carrier along the aisle 40 to the selected one of the storage locations 32. The transfer track assembly 92 is then extended (FIGS. 3 and 10) to form a continuation of the storage track 94 at the selected storage location 32. The shuttle assembly 88 is extended (see FIG. 3) to move the carrier 24 outwardly along the transfer track assembly 92 onto the storage track 94 at the selected storage location. When the shuttle assembly 88 is fully extended, a hanger assembly 102 suspending the carrier 24 from the storage track 94 is in engagement with a stop bolt 104. Toward the end of the outward stroke of the shuttle assembly 88, the gripper assembly 100 is opened to release the carrier 24. The shuttle assembly 88 and transfer track assembly 92 are then retracted so that the vehicle 22 can move along the aisle 40 to engage and transport other carriers.

When a carrier 24 is to be retrieved from its storage location 32 and transferred to the conveyor track 56, the vehicle 22 moves along the aisle 40 until the transfer track assembly 92 is aligned with the storage track 94 on which the selected carrier 24 is stored. The transfer track assembly 92 is then extended into engagement with the storage track 94 to form a continuous track arrangement interconnecting the vehicle 22 and the selected storage location 32. The shuttle assembly 88 is also extended and the gripper assembly 100 operated to engage the hanger assembly 102 of the selected carrier 24. The shuttle assembly 88 is then retracted and the selected carrier is moved along storage track 94 onto the transfer track assembly 92. After the transfer track assembly 92 and shuttle assembly 88 have been fully retracted, the shuttle assembly holds the carrier 24 centered relative to the mast 70 of the stacker crane 22 as it moves along the aisle 40 toward the transfer station 30.

Upon reaching the transfer station 30, the transfer track assembly 92 is moved into alignment with the conveyor track 56 and is extended to form a continuation of the conveyor track. The shuttle assembly 88 is extended and the carrier 24 is pushed from the transfer assembly 84 on the vehicle 22 onto the conveyor track 56. The gripper assembly 100 is then opened to release the carrier 24 on the conveyor track 56. The shuttle assembly 88 and transfer track assembly 92 are then retracted and the carrier 24 is free to move along the conveyor track 56 to the work location where materials on the carrier are to be used.

Figure 4:
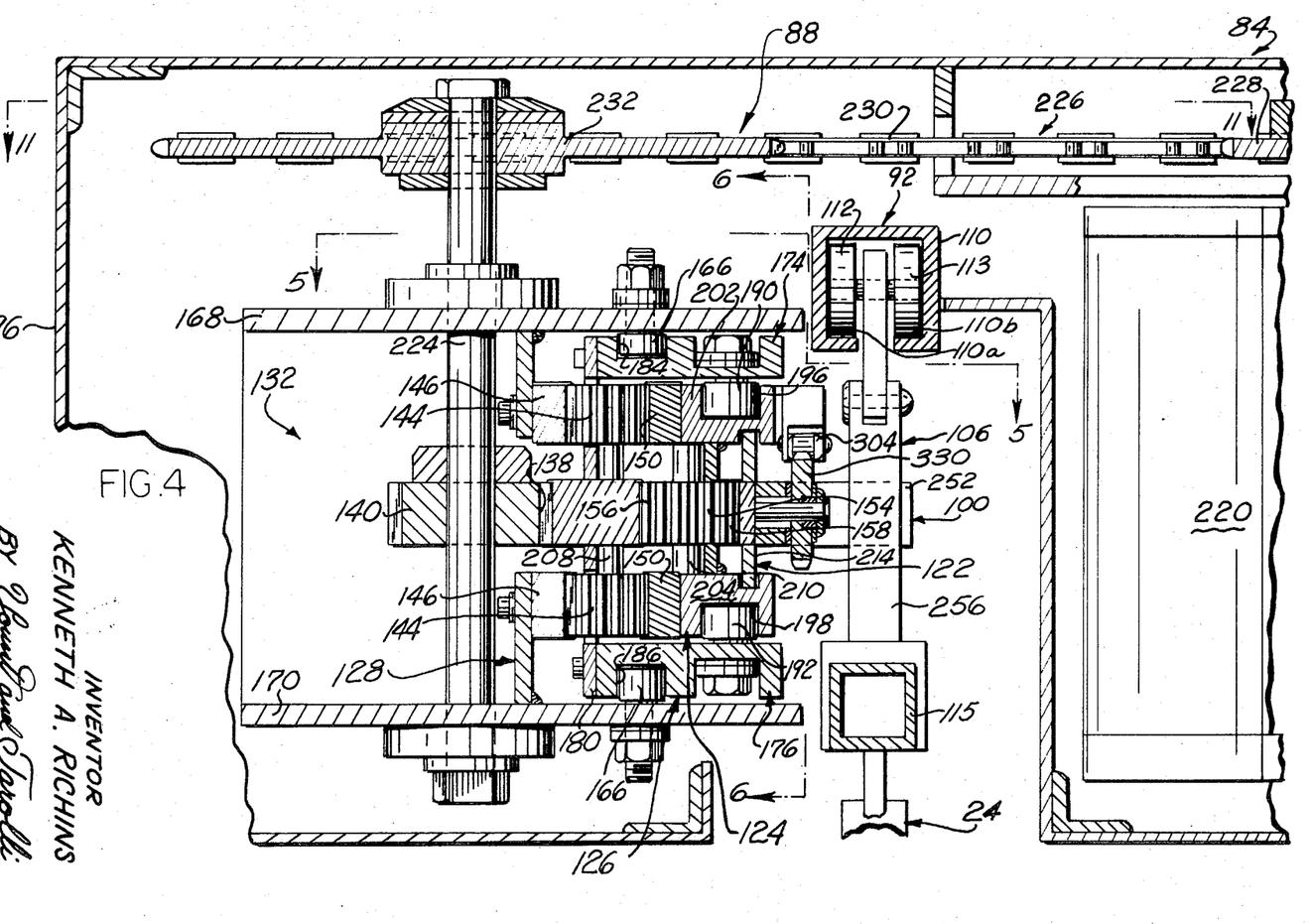
FIG. 4 is a sectional view, taken generally along the line 4—4 of FIG. 3, illustrating the relationship between the shuttle assembly, a transfer rail or track on the vehicle, and a material carrier.

In accordance with a feature of the present invention, the same carrier 24 is utilized to transport materials along the conveyor tracks 52 and 56, to hold the materials as they are moved to and from a storage location by the vehicle 22, and to support the materials at the selected storage location. To this end, the hanger assembly 102 of the carrier 24 includes a pair of dollies 106 (only one of which is shown in FIGS. 3 and 4) for engaging the conveyor tracks 52 and 56, a transfer rail 110 of the track assembly 92, and the storage tracks 94. The dollies 106 each include a pair of rollers or wheels 112 and 113 (FIG. 4) which roll along and are guided by the inside of the conveyor tracks 52 and 54, the transfer rail 110, and the storage tracks 94 when the carrier 24 is being moved relative thereto. The rollers or wheels 112 and 113 are supported by surfaces 110a and 110b of the transfer rail 110. Of course, the rollers 112 and 113 are also supported by similar surfaces on the conveyor tracks 52 and 56 and storage tracks 94 when they are in engagement with these tracks. The conveyor tracks 52 and 56, transfer rail 92, and support tracks 94 are all of the same size and cross-sectional configuration to enable the dollies 106 to be readily moved between them when the surfaces 110a and 110b of the transfer rail are aligned with similar surfaces of the conveyor or storage tracks.

A carrier framework 114 is suspended from the dollies 106 by a crossbar 115 which extends between the dollies. As the dollies 106 roll onto or off of the transfer rail 110, opposite sides of the lower part of the carrier framework 114 are engaged by parallel guide bars or tracks 116 and 117 (see FIG. 1). In addition to guiding movement of the carrier 24 on and off the lift assembly 74, the guide bars 116 and 117 retain the carrier framework 114 against swinging movement relative to the mast 70 as the crane 22 moves along the aisle 40. The guide bars 116 and 117 are connected with the transfer assembly 84 by a support structure 118 so that the guide bars move up and down along the mast 70 (FIG. 2) with the transfer assembly. Of course, the arrangement of the guide bars 116 and 117 will vary with variations in the construction of the material carriers 24. For example if "tote" boxes were used as the material carriers, the guide bars 116 and 117 would be located adjacent to a support surface of a transfer track and spaced apart by the width of the boxes. The box would be supported by the surface of the transfer track and guided by the bars as the box moved between the support surface of the transfer track and a support surface of a conveyor track or a storage track. Of course, guides would be associated with the support surfaces of the conveyor and storage tracks.

Figure 5:
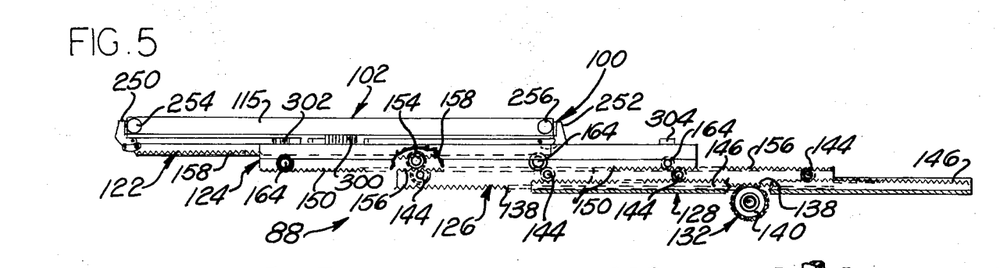
FIG. 5 is a schematic illustration taken generally along the line 5—5 of FIG. 4, depicting the shuttle assembly in a partially extended condition.
Figure 6:
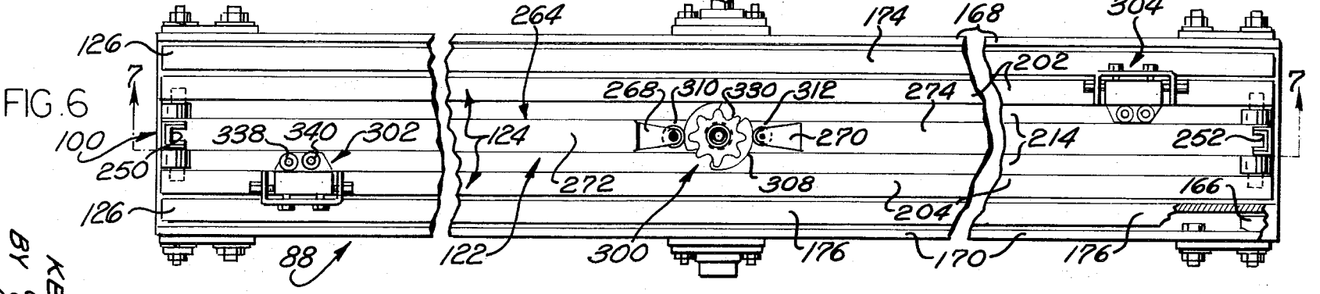
FIG. 6 is a fragmentary plan view, taken generally along the line 6—6 of FIG. 4, illustrating the shuttle assembly in a retracted condition.

The shuttle assembly 88 is telescopically extended and retracted by moving a gripper support section 122 and a pair of intermediate sections 124 and 126 relative to a base section 128 (see FIGS. 4 and 5). When the shuttle assembly 88 is in a retracted condition within the housing 96 (FIG. 6), the gripper support section 122, intermediate sections 124 and 126, and base section 128 are all telescoped together to provide a relatively compact assembly which can be moved along a relatively narrow aisle 40. When the shuttle assembly 88 is operated to the extended condition, the inner or first intermediate section 126 is moved outwardly relative to the base 128 while the outer or second intermediate section 124 is moved outwardly relative to the first intermediate section 126 (see FIG. 5). Simultaneously with this relative movement between the intermediate sections 124 and 126, the gripper support section 122 is moved outwardly relative to the outer intermediate section. Since the sections 122, 124 and 126 of the shuttle assembly 88 are simultaneously moved outwardly relative to each other as well as to the base 128, the shuttle assembly can be projected through a relatively large distance to move relatively long hanger assemblies 102 on and off the transfer rail 110. Although the shuttle assembly is depicted in FIGS. 3 and 5 as being extended toward the left, it should be understood that the shuttle assembly 88 can also be extended toward the right.

Upon extension of the shuttle assembly 88 toward the left or right, the gripper support section 122 of the shuttle assembly is moved through a larger distance relative to the base 128 than are the two intermediate sections 124 and 126. Similarly, the outer or second intermediate section 124 is moved through a larger distance relative to the base 128 than is the inner or first intermediate section 126 when the shuttle assembly is operated between the extended and retracted conditions. To provide for this relative movement between the sections of the shuttle assembly 88, a shuttle drive mechanism 132 is operable to move the gripper support section 122 at a greater speed relative to the base section 128 than the speed at which the two intermediate sections 124 and 126 are moved relative to the base section. Similarly, the drive mechanism 132 moves the outer intermediate section 124 at a greater speed relative to the base section 128 than the speed at which the inner intermediate section 126 is moved relative to the base section 128. This relatively fast movement of the gripper support section 122 through a relatively large distance upon extension and retraction of the shuttle assembly 88 enables the shuttle assembly to be quickly extended and retracted through relatively large distances toward the right or left from a compact retracted condition within the housing 96.

To provide for this relative movement between the sections 122, 124, 126 and 128 upon extension of the shuttle assembly 88, the drive mechanism 132 includes a rack and pinion gear drive arrangement for driving the outer or second intermediate section 124 outwardly of the inner or first intermediate section 126 and for simultaneously driving the gripper support section 122 outwardly of the outer intermediate section 124 (see FIG. 5). Thus, the inner or first intermediate section 126 includes a rack gear 138 which is driven toward the left by counterclockwise rotation of a main drive pinion 140 upon extension of the shuttle assembly 88 toward the left (as viewed in FIG. 5). This leftward movement of the intermediate section 126 results in pinion gears 144, which are rotatably mounted on the intermediate section 126, being driven in a counterclockwise direction (as viewed in FIG. 5) by a pair of stationary rack gears 146 (FIG. 4). This rotational movement of the pinion gears 144 drives a pair of rack gears 150 on the outer intermediate section 124 to thereby move the outer intermediate section outwardly of the inner intermediate section 126 as the inner intermediate section is being driven outwardly of the base section 128.

The gripper support section 122 is moved outwardly of the outer intermediate section 124 while both of them are being moved outwardly of the inner intermediate section 126. Accordingly, pinion gears 154 (FIGS. 4 and 5) are rotatably mounted on the outer intermediate section 124 in meshing engagement with a rack gear 156 on the inner intermediate section 126 and with a rack gear 158 on the gripper support section 122. Therefore, upon movement of the outer intermediate section 124 relative to the inner intermediate section 126 under the influence of the pinion gears 144, the pinion gears 154 are driven in a counterclockwise direction (as viewed in FIG. 5) by the rack gear 156. This rotation of the pinion gears 154 moves the rack gear 158 toward the left (as viewed in FIG. 5) to extend the gripper support section 122 outwardly of the intermediate section 124. Although only one of the pinions 154 has been shown in FIG. 5, other pinions are mounted on shafts designated 164 in FIG. 5. In fact, it should be understood that sufficient pinions are mounted on the intermediate sections 124 and 126 of the shuttle assembly 88 to drive the sections of the shuttle assembly to either the right or left to fully extended conditions in which the gripper support section 122 is located within a storage location and is spaced outwardly from the mast of the stacker crane 22.

When the shuttle assembly 88 is to be retracted, the foregoing operation of the drive mechanism 132 is reversed. Thus, the main drive pinion 132 is rotated in a clockwise direction to drive the inner intermediate section 126 toward the right (as viewed in FIG. 5). The rightward movement of inner intermediate section 126 results in the pinion gears 144 being rotated in a clockwise direction (as viewed in FIG. 5) to move the outer intermediate section 124 toward the right. Simultaneously with this rightward retracting movement of the intermediate sections 124 and 126, the gripper support section 122 is driven toward the right at a relatively high speed by clockwise rotation (as viewed in FIG. 5) of the pinion gears 154.

When the shuttle assembly 88 is extended toward the right (as viewed in FIG. 5), the drive mechanism 132 is operated in the same manner as when the shuttle assembly is retracted from a leftward extended condition. Similarly, when the shuttle assembly 88 is retracted toward the left (as viewed in FIG. 5) from a rightward extended condition, the drive mechanism 132 is operated in the same manner as when the shuttle assembly is extended toward the left (as viewed in FIG. 5).

The sections 122, 124 and 126 of the shuttle assembly 88 are supported for simultaneous movement relative to each other and relative to the base 128 by guides which engage tracks formed in the sections. Thus, guide rollers 166 (see FIG. 4) are mounted on opposite side walls 168 and 170 of the shuttle assembly base section 128 and engage parallel guide walls 174 and 176 mounted on a base plate 180 of the inner or first intermediate section 126. Although only two guide rollers 166 have been shown in FIG. 4, it should be understood that a plurality of guide rollers are distributed along the walls 168 and 170 in rolling engagement with longitudinally extending guide tracks 184 and 186 formed in the walls 174 and 176 of the intermediate section to thereby guide movement of the intermediate section relative to the base section 128. Similarly, rollers 190 and 192 are mounted on the walls 174 and 176 in engagement with guide tracks 196 and 198 in walls 202 and 204 of the intermediate section 124. It should be noted that the pinions 144 are mounted between the walls 174 and 176 of the intermediate section 126 on support shafts 208. Similarly, the pinions 154 are mounted between the walls 202 and 204 of the outer intermediate section 124 on support shafts 210. Finally, the gripper support section 122 is mounted on the outer support section 124 by means of a plate 214 which slidably engages longitudinally extending guide grooves formed in the walls 202 and 204 of the outer intermediate section 124.

A drive motor 220 (FIG. 4) mounted within the housing 96 is connected with the main drive pinion 140 by a drive chain arrangement 226. The drive chain arrangement 226 includes a drive sprocket 228, chain 230, and drive sprocket 232 mounted on the drive shaft 224. The motor 220 is reversible to drive the pinion 140 in a counterclockwise direction to extend the shuttle assembly to the left as viewed in FIG. 5 or in a clockwise direction to extend the shuttle assembly to the right as viewed in FIG. 5.

Upon operation of the shuttle assembly 88 to either the right or left extended conditions, limit switches (not shown) are actuated and suitable control circuitry reverses the direction of operation of the motor 220 to initiate retraction of the shuttle assembly. Upon operation of the shuttle assembly 88 to the retracted condition from either of the extended conditions, limit switches are actuated to de-energize the motor 220 and interrupt movement of the shuttle assembly. The limit switches are associated with the relatively movable sections of the shuttle assembly in the same general manner disclosed in U. S. Pat. application Ser. No. 812,010, filed by Stephan F. Aaronson et al. on Apr. 1, 1969 and entitled "Load Handling Apparatus." Although the specific shuttle assembly 88 illustrated in FIGS. 4 and 5 is advantageously used in the material handling system 20, it should be understood that the construction of the shuttle assembly could be changed somewhat from the specific preferred construction shown in the drawings. For example, the shuttle assembly may be constructed in much the same manner as is the shuttle assembly of the aforesaid Aaronson et al application.

Figure 7:
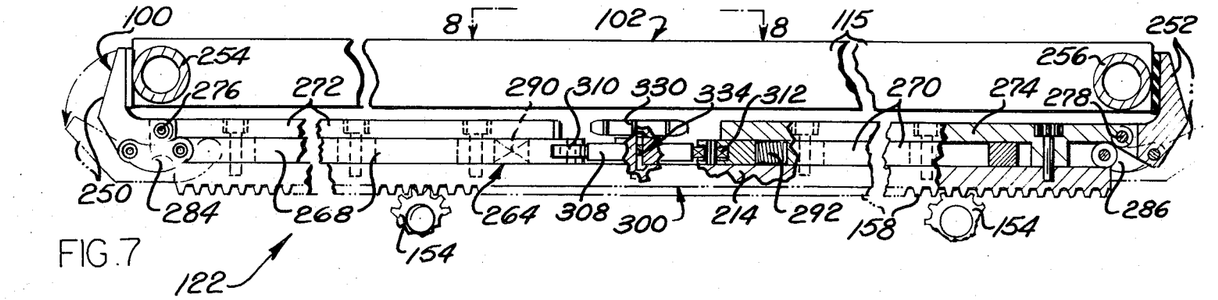
FIG. 7 is a fragmentary elevational view, taken generally along the line 7—7 of FIG. 6, illustrating the construction of a gripper assembly which engages a material carrier and moves it relative to the transfer rail or track on the vehicle upon extension or retraction of the shuttle assembly.
Figure 8:
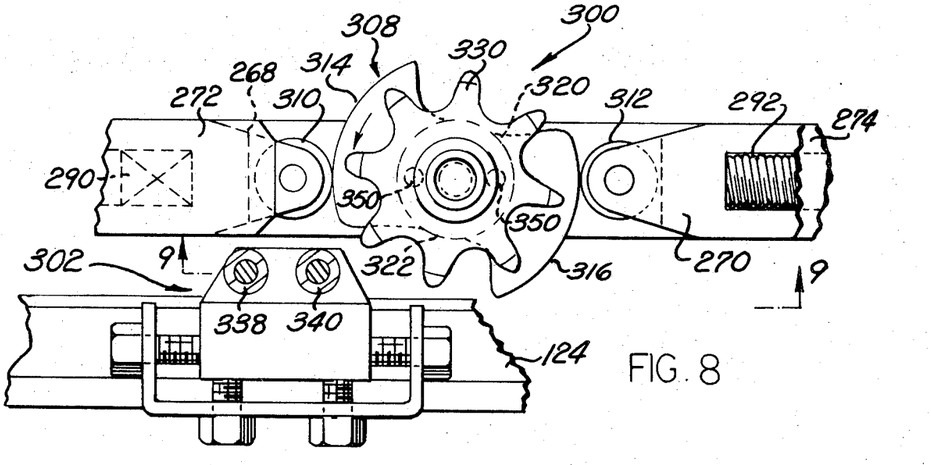
FIG. 8 is an enlarged fragmentary plan view, taken along the line 8—8 of FIG. 7, illustrating an operator assembly for opening and closing the gripper assembly.

The gripper assembly 100 (see FIGS. 6 and 7) includes a pair of gripper fingers or elements 250 and 252 which are movable between a closed position (illustrated in solid lines in FIG. 7) and an open position (illustrated in dashed lines in FIG. 7). In the closed position the gripper fingers 250 and 252 engage support links 254 and 256 (FIGS. 5 and 7) which connect the dollies 106 of the hanger assembly 102 with the support bar 115. In open position (shown in dashed lines in FIG. 7) the gripper fingers 250 and 252 are pivoted inwardly toward the gripper support section 122 so that the fingers are clear of the links 254 and 256.

Upon retraction of the shuttle assembly 88 from a leftward extended condition with the gripper fingers 250 and 252 in the closed position engaging a carrier 24 on a storage track 94 (FIG. 3), the gripper finger 250 pushes against link 254 to move the hanger assembly 102 of the carrier onto the transfer rail 110. Similarly, when the shuttle assembly 88 is being extended leftwardly to move a carrier 24 from the transfer rail 110 onto a storage track 94, the gripper fingers 250 and 252 are closed. Therefore, the gripper finger 252 (FIG. 5) pushes against the connector link 256 to move the hanger assembly 102 from the transfer rail 110 onto the storage track 94. During this movement of the hanger assembly 102 between the transfer rail 110 and storage track 94, the transfer rail and storage track engage the dollies 106 to guide the carrier 24.

When the carrier 24 is to be moved leftwardly from a storage track 94 or the conveyor track 52 onto the transfer rail 110, the gripper finger 252 pushes against the connector link 256 as the shuttle assembly 88 is retracted. Of course, when the shuttle assembly 88 is extended to the right (as viewed in FIGS. 5 and 7) to move a carrier 24 from the transfer rail 110 onto either a storage track 94 or the conveyor track 56, the gripper finger 250 pushes against the hanger assembly 102. Thus, the gripper fingers 250 and 252 engage opposite ends of a hanger assembly 102 to enable a carrier 24 to be pushed toward either the right or the left by operation of the shuttle assembly 88.

The gripper fingers 250 and 252 are operated between the closed position (shown in solid lines in FIG. 7) and an open position (shown in dashed lines in FIG. 7) as the shuttle assembly 88 approaches a fully extended condition. Thus, when the shuttle assembly 88 is being extended to move a carrier 24 from the transfer rail 110 onto a storage rail 94 (FIG. 3), the gripper fingers 250 and 252 are pivoted to the open or release position as the shuttle assembly is fully extended and the dolly 106 moves into engagement with the stop member 104. After the gripper fingers 250 and 252 have been operated to the open con-dition, the shuttle assembly is retracted and the gripper fingers move past the links 254 and 256 without moving the carrier 24. Similarly, when the shuttle assembly 88 is being extended to engage a carrier, such as a carrier 24 suspended from one of the storage tracks 94, the gripper fingers 250 and 252 are in the open condition. As the shuttle assembly approaches the fully extended condition, the gripper fingers 250 and 252 are operated to the closed position to engage the support links 254 and 256. During subsequent retraction of the shuttle assembly 88, the gripper fingers 250 and 252 are maintained in their closed positions and the carrier 24 is moved from the storage track 94 onto the transfer rail 110.

A linkage arrangement 264 (FIGS. 6 and 7) is provided for operating the gripper fingers 250 and 252 between the open and closed positions during movement of the shuttle assembly 88 to the extended condition.

The linkage 264 includes a pair of actuator bars 268 and 270 which are slidably mounted on the support plate 214 inwardly of a pair of holding bars 272 and 274. The gripper fingers 250 and 252 are pivotally mounted at 276 and 278 on the holding bars 272 and 274 (see FIG. 7). The outer ends of the actuator bars 268 and 270 are connected with the associated gripper fingers 250 and 252 by links 284 and 286. Upon inward movement of the actuator bars 268 and 270 under the influence of biasing springs 290 and 292, the gripper fingers 250 and 252 are pivoted from the closed position (shown in solid lines in FIG. 7) to the open position (shown in dashed lines in FIG. 7) by the links 284 and 286. Similarly, actuator bars 268 and 270 are moved outwardly, against the influence of the biasing springs 290 and 292, to effect pivoting movement of the gripper fingers 250 and 252 from the open position to the closed position.

An operator assembly 300 is activated by an actuator assembly 302 when the shuttle assembly 88 is extended toward the left (as viewed in FIG. 6) to effect movement of the gripper fingers 250 and 252 between the open and closed positions. Similarly, the operator assembly 300 is activated by an actuator assembly 304 when the shuttle assembly 88 is extended toward the right (as viewed in FIG. 6) to thereby effect operation of the gripper fingers 250 and 252 between the open and closed positions. The actuator assembly 300 includes a cam 308 which is engaged by follower rollers 310 and 312 mounted on inner ends of the actuator rods or bars 268 and 270 (see FIGS. 6 to 9).

When the cam followers 310 and 312 are in engagement with radially outer or crest surface portions 314 and 316 (FIG. 8) of the cam 308, the actuator rods 268 and 270 are held outwardly against the influence of the biasing springs 290 and 292 so that the gripper fingers 250 and 252 are held in the closed position shown in solid lines in FIG. 7. Upon rotation of the cam 308 through a quarter turn or 90° in a counterclockwise direction (as viewed in FIG. 8), the cam followers 310 and 312 move into engagement with radially inward or trough surface portions 320 and 322 of the cam 308 under the influence of the biasing springs 290 and 292. This inward movement of the cam followers 310 and 312 results in the actuator bars 268 and 270 being moved inwardly to pivot the gripper fingers 250 and 252 to the open position shown in dashed lines in FIG. 7. Of course, subsequent rotation of the cam 308 through an additional quarter turn in the counterclockwise direction (as viewed in FIG. 8) results in the cam followers 310 and 312 being moved outwardly to pivot the gripper fingers 250 and 252 from the open position to the closed position shown in solid lines in FIG. 7.

The cam 308 is rotated through a quarter turn or 90° (in a counterclockwise direction as viewed in FIG. 8) each time the shuttle assembly 88 is extended. To provide for this rotation of the cam 308, a drive sprocket 330 is connected with the cam 308 by a ratchet 334 (see FIG. 9). Upon movement of the gripper support section 122 from the retracted condition of FIG. 6 toward the extended condition, the gripper support section is moved outwardly of the outer intermediate section 124 of the shuttle assembly 88. This results in the drive sprocket 330 being moved outwardly past the actuator assembly 302 (see FIGS. 6 and 8) mounted on the outer intermediate section of the shuttle assembly 88. As the drive sprocket 330 moves leftward past the actuator assembly 302 (as viewed in FIGS. 6 and 8), the drive sprocket is rotated through 90° in a counterclockwise direction by the actuator assembly 302. This rotational movement of sprocket 330 rotates the cam 308 in a counterclockwise direction through the same angular distance to operate the gripper fingers 250 and 252 between the open and closed positions.

The actuator assembly 302 includes a plurality of rollers 338 and 340 which are mounted on the outer intermediate section 124. The teeth on the drive sprocket 330 engage the rollers 338 and 340 as the gripper support section 122 moves outwardly of the outer intermediate section 124 of the shuttle assembly 88. As the shuttle assembly continues to be extended, the rollers 338 and 340 rotate the sprocket 330 and the cam 308 through a quarter turn in a counterclockwise direction as viewed in FIG. 8. This rotational movement of the cam 308 results in the actuator bars 268 and 270 being moved to operate the gripper fingers 250 and 252 between the open and closed positions in a manner previously explained.

The actuator assembly 304 (FIG. 6) is of the same construction as the actuator assembly 302 and is also mounted on the outer intermediate section 124 of the shuttle assembly 88. However, the actuator assemblies 302 and 304 are mounted on opposite sides of the gripper support section 122. Therefore, upon extension of the shuttle assembly 88 toward the right (as viewed in FIG. 6) the drive sprocket 330 is rotated through a quarter turn in a counterclockwise direction by the actuator assembly 304. Of course, this effects counterclockwise rotation of the cam 308 through the same angular distance. Thus, the actuator assemblies 302 and 304 effect rotation of the cam 308 through a quarter turn in a counterclockwise direction (as viewed in FIG. 8) upon operation of the shuttle assembly toward either a rightward or a leftward extended condition. This rotation of the cam 308 results in the actuator bars 268 and 270 being moved to operate the gripper fingers 250 and 252 from the closed position to the open position to deposit a carrier 24 or from the open position the the closed position to engage a carrier.

When the shuttle assembly 88 is being retracted, the gripper fingers 250 and 252 remain in the position to which they were operated as the shuttle assembly was extended. Thus, when a selected carrier 24 is being retrieved from a storage track 94, the gripper fingers 250 and 252 are operated from the open position to the closed position at the end of the outward stroke of the shuttle assembly 88 to thereby engage the selected carrier. The gripper fingers 250 and 252 remain closed as the shuttle assembly 88 is retracted so that the gripper fingers push the selected carrier 24 onto the transfer rail 110 on the vehicle 22. Similarly, when a carrier 24 is being deposited at a selected storage location 32, the gripper fingers 250 and 252 are operated from the closed position to the open position at the end of the outward stroke of the shuttle assembly 88 to release the carrier 24 at the selected storage location. The gripper fingers 250 and 252 remain open as the shuttle assembly 88 is retracted so that the gripper fingers clear the carrier during the return stroke of the shuttle assembly.

Figure 9:
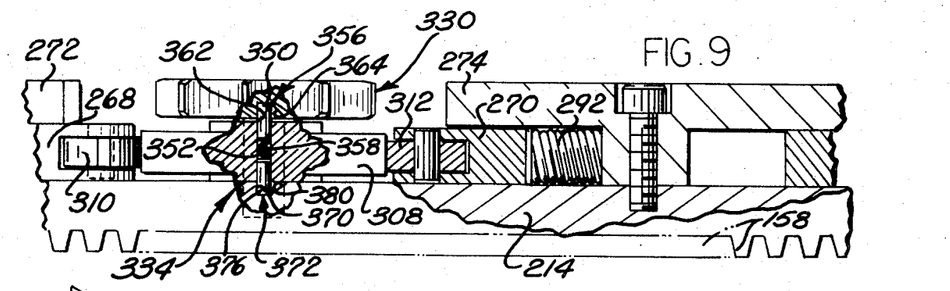
FIG. 9 is an enlarged fragmentary elevational view, taken generally along the line 9—9 of FIG. 8, illustrating a ratchet assembly which enables the operator assembly to actuate the gripper assembly between the open and closed conditions upon extension of the shuttle assembly and prevents actuation of the gripper assembly upon retraction of the shuttle assembly.

When the shuttle assembly 88 is almost fully extended, the drive sprocket 330 engages either the actuator assembly 302 or the actuator assembly 304 (FIG. 6) and is rotated in a counterclockwise direction to operate the gripper fingers 250 and 252 between the open and closed positions. As the shuttle assembly 88 is retracted, the drive sprocket 330 again engages one of the actuator assemblies 302 or 304. However, this time the drive sprocket is rotated in a clockwise direction (as viewed in FIGS. 6 and 8). To prevent the gripper fingers 250 and 252 from being operated in response to this clockwise rotation of the sprocket 330 during retraction of the shuttle assembly 88, the drive sprocket is connected with the cam 308 by the one-way ratchet mechanism 334 (FIG. 9).

The ratchet mechanism 334 is effective to transmit motion from the drive sprocket 330 to the cam 308 when the drive sprocket is rotated in a counterclockwise direction (as viewed in FIG. 8) by one of the actuator assemblies 302 or 304. However, the ratchet mechanism 334 is ineffective to transmit rotational movement to the cam 308 when the drive sprocket 330 is rotated in a clockwise direction (as viewed in FIG. 8) by one of the actuator assemblies 302 or 304. The ratchet mechanism 334 (FIG. 9) includes a cylinderical drive pin 350 which is slidably disposed in a cylindrical opening 352 in the cam 308. The drive pin 350 is biased into engagement with a recess 356 in the sprocket 330 by a spring 358. The recess 356 has a generally triangular corss-sectional configuration formed by an axially extending base or drive surface 362 and a sloping ramp or cam surface 364.

When the drive sprocket 330 is rotated in a counterclockwise direction (as viewed in FIG. 8), the drive surface 362 (FIG. 9) in the sprocket presses against the pin 350 to rotate the cam 308 with the sprocket. However, when the drive sprocket 330 is rotated in a clockwise direction (as viewed in FIG. 8), the drive pin 350 is cammed or forced inwardly by the ramp 364 (FIG. 9) so that the drive pin 350 is ineffective to transmit the clockwise rotation of the sprocket to the cam 308. Thus, the ratchet mechanism 334 enables the drive sprocket 330 to rotate the cam 308 in a counterclockwise direction when the shuttle assembly 88 is extended to either the right or the left as viewed in FIG. 6. Therefore upon extension of the shuttle assembly 88, the gripper fingers 250 and 252 are operated between the open and closed positions. However, upon retraction of the shuttle assembly, toward either the right or the left as viewed in FIG. 6, the ratchet mechanism 334 renders the drive sprocket 330 ineffective to rotate the cam 308. Therefore upon retraction of the shuttle assembly 88, the gripper fingers 250 and 252 are not operated between the open and closed positions. It should be noted that the ratchet mechanism 334 includes a plurality of pins, similar to the pin 350 (see FIG. 8), which cooperate with recesses similar to the recess 356.

The ratchet mechanism 334 also includes a plurality of retaining or stop pins 370 (FIG. 9) which cooperate with recesses 372 formed in the support plate 214 of the gripper support section 122 to retain the cam 308 against rotation as the drive pin 350 is moved inwardly by the ramp 364. Thus, the recess 372 includes a stop surface 376 for engaging the pin 370 which is slidably disposed in the cylindrical opening 352 in the cam 308. The stop surface 376 retains the pin and cam against movement in a clockwise direction (as viewed in FIG. 8). The recess 372 also includes a ramp or cam surface 380 for moving the pin 370 outwardly against the influence of the spring 358 as the cam 308 is rotated in a counterclockwise direction (as viewed in FIG. 8).

From the foregoing description, it is apparent that the gripper fingers 250 and 252 are operated between the open and closed positions only during extension of the shuttle assembly 88. This results in the gripper fingers 250 and 252 being positioned for the next succeeding operation each time the shuttle assembly 88 is extended. For example, if the shuttle assembly 88 is extended to deposit a carrier 24 on a storage track 94, the gripper fingers 250 and 252 are operated from the closed position (shown in solid lines in FIG. 7) to the open position (shown in dashed lines in FIG. 7) as the shuttle assembly approaches the fully extended condition. The gripper fingers 250 and 252 remain in the open position as the shuttle assembly 88 is retracted. The vehicle 22 is then moved to another storage location or to a position adjacent to one of the conveyor tracks 52 or 56 (see FIG. 1) and the shuttle assembly 88 is extended to engage a carrier 24. Since the gripper fingers 250 and 252 are in the open position (shown in dashed lines in FIG. 7) they will move past the hanger support links 254 and 256 for this carrier as the shuttle assembly is extended. The gripper fingers 250 and 252 are pivoted to the closed position (shown in solid lines in FIG. 7) to engage the carrier 24 when the shuttle assembly 88 is almost fully extended and the support links 254 and 256 are located between the gripper fingers.

Once a carrier 24 has been engaged by the extended shuttle assembly 88, the shuttle assembly is retracted to move the carrier onto the transfer rail 110 on the vehicle 22. The gripper fingers 250 and 252 remain in the closed position as the shuttle assembly is retracted and while the vehicle 22 is moving down the aisle 40 (FIG. 1). This enables the gripper fingers 250 and 252 to hold the carrier 24 against sideward movement along the transfer rail 110 as the carrier is moved along the aisle 40. It should be noted that the carrier 24 is held against backward and forward movement by the guide bars 116 and 117 (FIGS. 1 and 2) as the vehicle 22 moves along the aisle.

Once the vehicle 22 has been moved adjacent to a position where the carrier 24 is to be deposited, the shuttle assembly 88 is extended. As the shuttle assembly approaches the end of this extending movement, the drive sprocket 330 and cam 308 are rotated in a counterclockwise direction (as viewed in FIG. 6) by one of the actuator assemblies 302 or 304. This operates the actuator bars 268 and 270 to move the gripper fingers 250 and 252 from the closed position (shown in solid lines in FIG. 7) to the open position (shown in dashed lines in FIG. 7) to release the carrier 24 at the storage location where it is to be deposited. Thus, the gripper fingers 250 and 252 are operated between their open and closed positions only during extension of the shuttle assembly 88. Since the shuttle assembly 88 is used to sequentially pick-up and deposit the carriers 24, this results in the gripper fingers 250 and 252 being positioned on one operation of the shuttle assembly for the next succeeding operation of the shuttle assembly.

When a carrier 24 is to be moved from the transfer rail 110 onto a storage track 94 (see FIGS. 3 and 10), the transfer rail is moved outwardly from a retracted position (shown in solid lines in FIG. 10) to an extended position (shown in dashed lines in FIG. 10) to form a continuation of the storage track. This enables the rollers 112 and 113 (FIG. 4) on the carrier to roll along the transfer rail 110 onto the storage track 94 as the shuttle assembly 88 is extended. Similarly, when a carrier 24 is to be moved from a storage track 94 to the vehicle 22, the transfer rail 110 is extended to provide a continuous track along which the dollies 106 can move as the carrier 24 moves onto the vehicle 22. While the transfer rail 110 has been illustrated in FIG. 10 as being extendable toward the left, it should be understood that the transfer rail can also be extended toward the right.

Figures 13, 14:
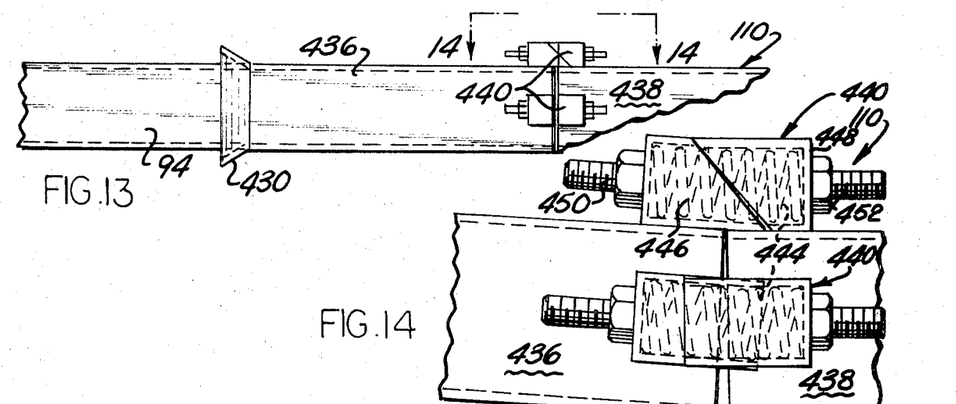
FIG. 13 is a fragmentary plan view illustrating the relationship between a yieldable end portion of the transfer rail and a storage track which is aligned with the transfer rail.
FIG. 14 is an enlarged plan view taken along the line 14—14 of FIG. 13, illustrating a yieldable connection for facilitating alignment of the end portion of the transfer rail with the storage track.

To enable the transfer assembly 84 to be as compact as possible when the vehicle 22 is moving along the aisle 40, the transfer rail 110 has an overall length which is only slightly greater than the distance between the dollies 106 of the hanger assembly 102. Therefore upon operation of the shuttle assembly 88 to the extended condition, the transfer rail 110 is extended at the same speed and in the same direction as the gripper support section 122. This prevents relative movement between the dollies 106 of the carrier and the transfer rail 110 so that the dollies remain on the transfer rail. Once the transfer rail 110 reaches the extended position (shown in dashed lines in FIG. 10) the transfer rail is in aligned engagement with the storage track 94 (FIG. 13) and the dollies 106 of the carrier 24 can move from the transfer rail 110 onto the storage track during continued extension of the shuttle assembly 88.

Similarly, when the shuttle assembly 88 is being retracted to move a carrier 24 from the storage track 94 onto the transfer rail 110, the transfer rail remains in aligned engagement with the storage track 94 until both of the dollies 106 of the carrier 24 are on the transfer rail 110. The transfer rail 110 is then retracted with the shuttle assembly 88. During this final portion of retraction of the shuttle assembly 88, there is little or no relative movement between the transfer rail 110 and carrier 24 even though they are both being moved relative to the vehicle 22. Of course, if the transfer rail 110 was substantially longer than the distance between the dollies 106 of the carrier 24, relative movement could occur between the carrier 24 and transfer rail 110 as the shuttle assembly 88 is extended and retracted.

Figure 11:
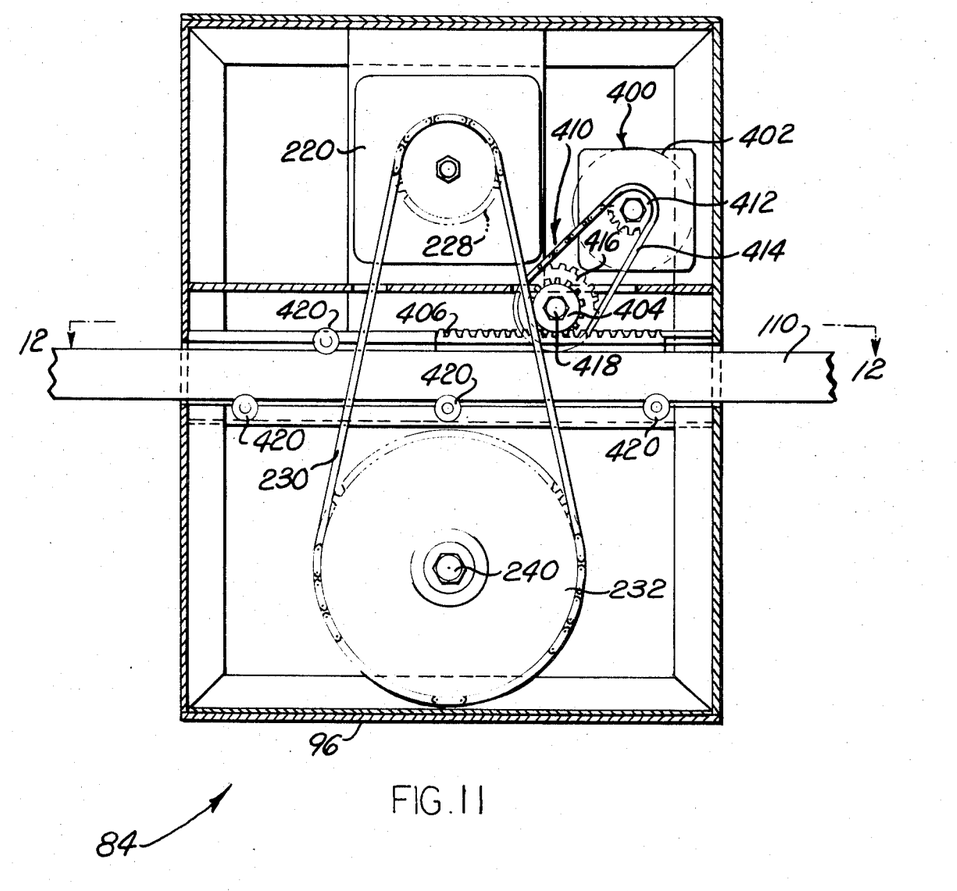
FIG. 11 is a schematic plan view, taken along the line 11—11 of FIG. 4, illustrating a drive assembly for extending and retracting the transfer rial.
Figure 12:
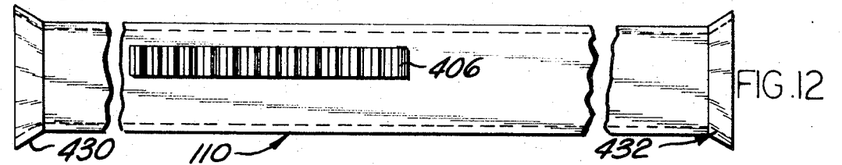
FIG. 12 is an enlarged plan view, taken along the line 12—12 of FIG. 11, illustrating the relationship between the transfer rail and a drive rack mounted thereon.

A drive assembly 400 (FIG. 11) is provided for extending the transfer rail 110 during initial extension of the shuttle assembly 88 and for retracting the transfer rail during the final portion of retraction of the shuttle assembly. The drive assembly 400 includes a reversible motor 402 which drives a pinion gear 404 which is in meshing engagement with a rack 406 mounted on the transfer rail 110 (see FIG. 12). The motor 402 is drivingly connected with the pinion gear 404 by a chain drive arrangement 410 which includes a drive sprocket 412 connected to an output shaft of the motor 402, a chain 414, and a second drive sprocket 416 which is fixedly connected with a shaft 418 along with the pinion gear 404.

Figure 10:
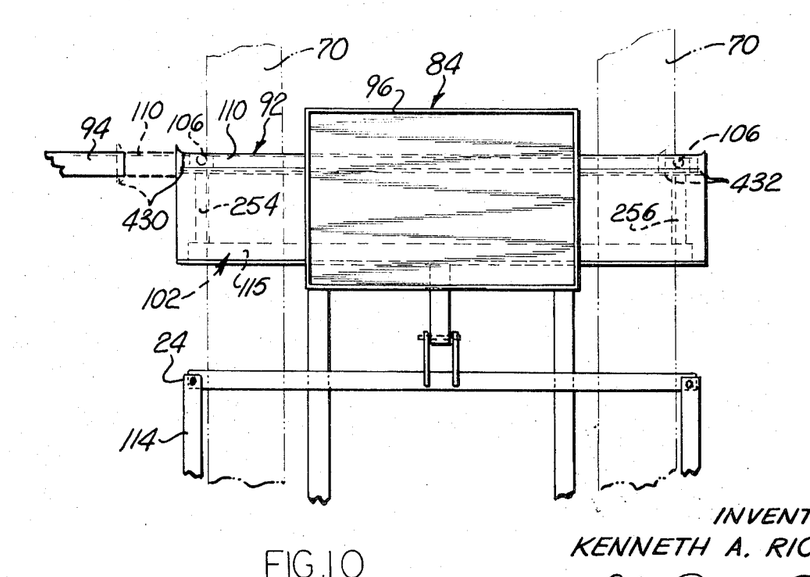
FIG. 10 (on sheet 2 of the drawings) is a fragmentary elevational view, further illustrating the relationship between the transfer rail and the vehicle, the transfer rail being shown in solid lines in a retracted position and in dashed lines in an extended position.

Upon operation of the motor 402, the pinion gear 404 drives the rack 406 to move the transfer rail 110 axially from the retracted position (shown in solid lines in FIG. 10) to the extended position (shown in dashed lines in FIG. 10). A plurality of rollers 420 (FIG. 11) engage opposite sides of the transfer rail 110 to guide its movement between the extended and retracted positions. Wen the transfer rail 110 is to be retracted, the direction of operation of the motor 402 is reversed to reverse the direction of rotation of the pinion gear 404. Of course, the transfer rail 110 can be extended toward either the left or the right (as viewed in FIG. 10) depending upon the direction in which the shuttle assembly is being extended.

The transfer rail has flared or funneled end portions 430 and 432 (see FIGS. 10 and 12) which assist in aligning the transfer rail 110 with the storage tracks 94 (FIG. 13) and the conveyor tracks 52 and 56. In addition, the transfer rail 110 has yieldable end portions 436 which are connected with a main portion 438 of the transfer rail by connector assemblies 440 (one of the yieldable end portions being shown in FIG. 13). The yieldable connectors 440 enable the end portion 436 of the transfer rail 110 to be deflected slightly upwardly or sidewardly by engagement of the flared end 430 of the transfer rail 110 with a storage track 94, in the manner shown in FIG. 13. Therefore, the transfer rail 110 can be moved into aligned engagement with the storage track 94 even if the transfer rail is not exactly aligned with the storage track by movement of the vehicle 22 along the aisle 40 and by movement of the transfer assembly 84 along the mast 70.

The yieldable connection 440 (FIG. 14) includes a spring 444 which is enclosed within a pair of housing sections 446 and 448. The housing section 446 is fixedly mounted on the end portion 436 of the transfer rail 110 and the housing section 448 is fixedly mounted on the main portion 438 of the transfer rail. The spring 444 is located within a cylindrical chamber in the housing sections 446 and 448 and is connected to the housing sections by bolts 450 and 452 which are fixedly connected to opposite end portions of the spring. The spring 444 tends to pull the housing sections 446 and 448 toward each other to hold the yieldable end portion 436 of the transfer rail in abutting engagement with the main portion 438 of the transfer rail 110. However, when a sideward force is applied to the end portion 436 of the transfer rail 110, the spring 444 is stretched somewhat and the housing sections 446 and 448 move relative to each other to enable the end portion 436 of the transfer rail 110 to be deflected. Therefore, when the transfer rail 110 is moved toward the storage track 94, the yieldable connection 440 enables the end portion 436 of the transfer rail to move into alignment with the storage track 94. The dollies 106 on the hanger assembly 102 can then move from the transfer rail 110 onto the storage track 94 even though the stacker crane 22 is not in exact alignment with the storage track 94.

In view of the foregoing description, it can be seen that the material handling system 20 includes a vehicle, in the illustrated embodiment of the invention a stacker crane 22, which is movable along an aisle 40 between conveyor tracks 52 and 56 and a plurality of storage tracks 94. Once the vehicle 22 has moved adjacent to a selected storage track 94, the transfer rail 110 and shuttle assembly 88 are extended to move a carrier 24 from the transfer rail 110 onto the storage track 94. As the shuttle assembly 88 reaches its fully extended position, a gripper assembly 100 is opened to release the carrier. The shuttle assembly 88 is then retracted and the vehicle 22 is moved along the aisle 40 to a position where a second one of the carriers 24 is to be engaged. Thereupon, the shuttle assembly is again extended and the gripper 100 is closed to engage the second carrier. The shuttle assembly is then retracted and the second carrier is moved from a track on which it was previously suspended onto the transfer rail 110. The vehicle 22 can then be moved along the aisle 40 to a location where the second carrier is to be deposited.

Having described specific preferred embodiments of the invention, the following is claimed:

1. A material handling system for moving carrier means for holding materials, said system comprising a plurality of lengths of storage track each of which is located at one of a plurality of storage locations disposed along an aisle and each of which is adapted to engage and support a carrier means at the associated storage location, a material handling vehicle movable along said aisle, transfer track means operatively connected to said vehicle and adapted to support a carrier means, said transfer track means being alignable with a length of storage track at a selected one of said storage locations to enable said carrier means to move between said transfer track means and a length of storage track at the selected one of said storage locations, shuttle means operatively connected with said vehicle for moving said carrier means between said transfer track means and the length of storage track at a selected one of said storage locations, and guide means connected with said vehicle and engageable with said carrier means for guiding movement of said carrier means between said transfer track means and a length of storage track at a selected one of said storage locations, said guide means being engageable with said carrier means during transportation of said carrier means between said transfer and storage locations by said vehicle, said shuttle means including gripper means for engaging said carrier means and extensible means for reciprocating said gripper means along a path extending parallel to a longitudinal axis of said transfer track means to move said carrier means between said transfer track means and said conveyor track and to move said carrier means between said transfer track means and the length of storage track at the selected storage location, said gripper means being operable between a closed condition in which said gripper means engages said carrier means to move said carrier means relative to said transfer track means upon movement of said gripper means by said extensible means and an open condition in which said gripper means is ineffective to move said carrier means relative to said transfer track means upon movement of said gripper means by said extensible means, and actuator means for effecting operation of said gripper means between the open and closed conditions upon outward movement of said gripper means by said extensible means in a direction away from said transfer track means, said actuator means being ineffective to operate said gripper means between the open and closed conditions upon inward movement of said gripper means by said extensible means in a direction toward said transfer track means.

2. A material handling system as set forth in claim 1 wherein said carrier means includes a framework for receiving materials and suspension means for suspending said framework from said transfer track means, and said storage tracks.

3. A material handling system as set forth in claim 1 wherein said transfer track means includes a length of transfer track having a cross-sectional configuration which is substantially the same as the cross-sectional configurations of the storage tracks.

4. A material handling system as set forth in claim 3 further including a conveyor track for guiding movement of the carrier means away from the vehicle to a work station, and said vehicle being operable to transport the carrier means from the storage locations to the conveyor tracks.

5. A material handling system set forth in claim 1 wherein the carrier means comprises a hanger for suspending the carrier means from the storage and transfer tracks, and said storage and transfer tracks having portions which engage the hanger means to support the carrier means thereon.

6. A material handling system as set forth in claim 3 wherein said transfer track means includes drive means for moving said length of transfer track relative to said vehicle along a path extending parallel to a longitudinal axis of said length of transfer track between a first position in which an end portion of said length of transfer track is spaced from an end portion of one of said storage tracks and a second portion in which said end portion of said length of transfer track engages said end portion of said one of said storage tracks and is axially aligned with said one of said storage tracks to enable said carrier means to move between a position in which it is supported by said length of transfer track and a position in which said carrier means is supported by said one of said storage tracks.

7. A material handling system as set forth in claim 6 wherein said transfer track means includes means for enabling said end portion of said length of transfer track to move in a direction transverse to the longitudinal axis of said length of transfer track and means for moving said end portion of said length of transfer track transversely to the longitudinal axis of said length of transfer track to align said end portion of said length of transfer track with said end portion of said one of said storage tracks.

8. A material handling system as set forth in claim 1 wherein said extensible means is operable between a retracted condition and an extended condition to move said gripper means relative to said transfer track means, said extensible means includes a base section connected with said vehicle, an intermediate section operatively connected with and mounted for movement relative to said base section, and a gripper support section operatively connected with said gripper means and said intermediate section and mounted for movement relative to said intermediate section, and wherein said shuttle means further includes drive means for moving said intermediate section through a first distance at a first speed relative to said base section upon operation of said extensible means between the retracted and extended conditions and for moving said gripper support section through a second distance at a second speed relative to said base section, said second distance being larger than said first distance and said second speed being greater than said first speed so that said gripper support section projects outwardly from said intermediate section and said intermediate section projects outwardly from said base section when extensible means is in the extended condition.

9. A material handling system as set forth in claim 1 wherein said shuttle means includes first drive means for effecting operation of said extensible means between a retracted condition and an extended condition to move said gripper means relative to said transfer track means, and wherein said transfer track means includes a length of transfer track and second drive means for moving said length of transfer track relative to said vehicle independently of operation of said extensible means between the retracted and extended conditions.

10. Material handling apparatus comprising a storage track, a material handling vehicle, a transfer track connected with the vehicle and alignable with said storage track, a carrier for holding materials, hanger means for suspending said carrier from said transfer track to support said carrier means in a suspended condition on the vehicle as the vehicle transports the carrier to said storage track and for suspending said carrier from said storage track, and a shuttle assembly operable between a retracted condition and an extended condition to move said hanger means between said transfer and storage tracks, said shuttle assembly including a pair of spaced apart gripper elements each of which is movable between a closed position engaging said hanger means and an open position spaced from said hanger means, linkage means operatively connected with said gripper elements for effecting movement of said gripper elements from their open positions to their closed positions to engage said hanger means and for effecting movement of said gripper elements from their closed positions to their open positions to release said hanger means, and actuator means for operating said linkage means to effect movement of said gripper elements from their closed positions to their open positions upon operation of said shuttle assembly to the extended condition to release said hanger means on said storage track and for operating said linkage means to effect movement of said gripper elements from their open positions to their closed positions upon operation of said shuttle assembly to the extended condition to engage said hanger means when it is on said storage track, said actuator means being ineffective to operate said linkage means to move said gripper elements between their open and closed conditions upon operation of said shuttle assembly from the extended condition to the retracted condition so that during operation of said shuttle assembly to the retracted condition said gripper elements remain in the positions to which they were moved during the immediately preceding operation of said shuttle assembly to the extended condition.

11. Material handling apparatus as set forth in claim 10 wherein said actuator means includes a rotatable cam disposed in operative engagement with said linkage means, a rotatable gear, ratchet means operatively interconnecting said gear and said cam for effecting rotation of said cam upon rotation of said gear in a first direction, said ratchet means being ineffective to effect rotation of said cam upon rotation of said gear in a second direction opposite from said first direction, and means for rotating said gear in the first direction upon operation of said shuttle assembly to the extended condition and for rotating said gear in the second direction upon operation of said shuttle assembly to the retracted condition.

12. Material handling apparatus as set forth in claim 11 wherein said linkage means includes a first follower member disposed in engagement with said cam and operatively connected with a first one of said gripper elements and a second follower member disposed in engagement with said cam and operatively connected with a second one of said gripper elements whereby rotation of said cam effects simultaneous operation of said first and second gripper elements between their open and closed positions.

13. Material handling apparatus comprising carrier means for holding materials, hanger means for suspending said carrier means from a storage track, a vehicle for transporting the materials, transfer track means operatively connected with the vehicle and engageable with said hanger means to support said carrier means in a suspended condition on the vehicle as it transports said carrier means, means on said vehicle for moving said hanger means from said storage track to said transfer track means, said transfer track means including a transfer rail movable between a transfer position in which the transfer rail projects outwardly of the vehicle and a transport position in which the transfer rail is retracted inwardly toward the vehicle from the transfer position and drive means for moving said transfer rail from the transport position to the transfer position when said transfer rail is in substantial alignment with said storage track to enable said hanger means to move between said transfer rail and storage track, said drive means including means for moving said transfer rail in a first direction from said transport position to a first transfer position in which said transfer rail projects outwardly of a first side of the vehicle and for moving said transfer rail in a second direction from said transport position to a second transfer position in which said transfer rail projects outwardly of a second side of the vehicle, said means for moving said hanger means including a shuttle assembly extendible in said first and second directions to move said hanger assembly relative to said transfer rail when said transfer rail is in either of said transfer positions, said shuttle assembly including having drive means for extending and retracting said shuttle assembly independently of movement of said transfer rail between the transfer and transport positions, said shuttle assembly including gripper means for engaging said hanger means and extensible means for reciprocating said gripper means along a path extending parallel to a longitudinal axis of said transfer rail to move said hanger means between said transfer rail and said storage track at a selected storage location, said gripper means being operable between a closed condition in which said gripper means engages said hanger means to move said hanger means relative to said transfer rail upon movement of said gripper means by said extensible means and an open condition in which said gripper means is ineffective to move said hanger means relative to said transfer rail upon movement of said gripper means by said extensible means, and actuator means for effecting operation of said gripper means between the open and closed conditions upon outward movement of said gripper means by said extensible means in a direction away from said vehicle, said actuator means being ineffective to operate said gripper means between the open and closed conditions upon inward movement of said gripper means by said extensible means in a direction toward said vehicle.

14. Material handling apparatus as set forth in claim 13 wherein said hanger means includes a dolly having roller means for engaging said transfer track means and storage track to support said carrier means for movement therealong.

15. Material handling apparatus as set forth in claim 13 wherein said transfer track means includes a transfer rail and means for enabling an end portion of said transfer rail to move transversely to a longitudinal axis of said transfer rail to facilitate aligning said transfer rail with said conveyor track.

16. Material handling apparatus as set forth in claim 13 wherein said transfer track means includes means for enabling said end portion of said transfer rail to move in a direction transverse to the longitudinal axis of said transfer rail and means for moving said end portion of said transfer rail transversely to the longitudinal axis of said transfer rail to align said end portion of said transfer rail with an end portion of said storage track.

* * * * *